United States Patent [19]
Sekita

[11] Patent Number: 5,995,287
[45] Date of Patent: *Nov. 30, 1999

[54] OPTICAL ELEMENT HAVING A PLURALITY OF DECENTERED REFLECTING CURVED SURFACES, AND OPTICAL INSTRUMENT INCLUDING THE SAME

[75] Inventor: Makoto Sekita, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/707,486

[22] Filed: Sep. 19, 1996

[30] Foreign Application Priority Data

Sep. 27, 1995 [JP] Japan ................................... 7-274894

[51] Int. Cl.$^6$ ............................... G02B 5/02; G02B 5/08
[52] U.S. Cl. ........................ 359/599; 359/839; 359/856; 359/857; 359/859
[58] Field of Search ..................... 359/599, 839, 359/856, 857, 859, 884, 364, 365, 726, 727, 267, 629, 630, 631, 634, 834; 385/119

[56] References Cited

U.S. PATENT DOCUMENTS

| | | | |
|---|---|---|---|
| 3,674,334 | 7/1972 | Offner | 350/55 |
| 4,775,217 | 10/1988 | Ellis | 350/538 |
| 5,042,928 | 8/1991 | Richards | 359/728 |
| 5,063,586 | 11/1991 | Jewell et al. | 378/34 |
| 5,093,567 | 3/1992 | Staveley | 250/221 |
| 5,179,471 | 1/1993 | Caskey et al. | 359/603 |
| 5,452,126 | 9/1995 | Johnson | 359/407 |
| 5,587,835 | 12/1996 | Shimizu et al. | 359/589 |
| 5,701,202 | 12/1997 | Takahashi | 359/631 |
| 5,818,641 | 10/1998 | Takahashi | 359/629 |

FOREIGN PATENT DOCUMENTS

| | | | |
|---|---|---|---|
| 2297516 | 12/1990 | Japan . | |
| 405150237 | 6/1993 | Japan | 359/599 |
| 7-104209 | 4/1995 | Japan . | |
| 7-333551 | 12/1995 | Japan . | |
| 8-50256 | 2/1996 | Japan . | |
| 8-179223 | 7/1996 | Japan . | |
| 8-179238 | 7/1996 | Japan . | |
| 8-234136 | 9/1996 | Japan . | |
| 8-234137 | 9/1996 | Japan . | |

OTHER PUBLICATIONS

S. Yamazaki, et al., "Development Of Super Compact HMD With Sight Line Input," Proceedings of 3D Image Conference '95 (Jul. 6, 1995), pp. 70–75 (and translation).

Primary Examiner—Cassandra Spyrou
Assistant Examiner—Mohammad Y. Sikder
Attorney, Agent, or Firm—Fitzpatrick, Cella, Harper & Scinto

[57] ABSTRACT

An integrally formed optical element includes an incident surface into which light flux from an object enters, a plurality of reflecting curved surfaces decentered one to the other from which the light flux entered from the incident surface is reflected and an emergent surface from which the light flux from the reflecting curved surfaces is emitted, wherein an antireflection film is applied onto the incident surface and the emergent surface, and wherein the light flux emitted from the emergent surface forms an image.

13 Claims, 12 Drawing Sheets

OPTICAL ELEMENT HAVING A PLURALITY OF DECENTERED REFLECTING CURVED SURFACES, AND OPTICAL INSTRUMENT INCLUDING THE SAME

BACKGROUND OF THE INVENTION

1. Field of the Invention

The present invention relates to an optical element, and more particularly, to an optical element suitable for use in an optical system of a video camera, a still video camera and a copying machine.

2. Description of the Related Art

Conventionally, various picture taking optical systems have been proposed in which reflecting surfaces such as concave mirrors and convex mirrors are utilized.

FIG. 1 schematically illustrates a main part of a so-called mirror optical system including one concave mirror and one convex mirror.

In the optical system of FIG. 1, light flux 134 from an object is reflected from concave mirror 131, travels toward the object while being converged, is reflected from convex mirror 132, and then forms an image on image surface 133.

The mirror optical system is based on the construction of the so-called Cassegrainian reflecting telescope, and is intended to shorten the total length of the optical system by folding the optical path of a telephoto lens system composed of refracting lenses by the use of two opposite reflecting mirrors.

In addition, in an objective lens system constituting a telescope, a number of methods in addition to the Cassegrainian method have been known in which the total length of the optical system is shortened by the use of a plurality of reflecting mirrors, based on the principles described above.

Thus, a method for obtaining a compact optical system has been conventionally known in which the optical path is efficiently folded with use of reflecting mirrors in place of a lens optical system having a long total length.

However, in the mirror optical system of the Cassegrainian reflecting telescope and the like, there is a problem that the light from the object is partially eclipsed by the convex mirror 132.

In order to solve the problem, a mirror optical system has been also proposed in which reflecting mirrors are decentered with respect to an optical axis in order to prevent the other parts of the optical system from shielding the passage region of the light flux 134, that is to say, the principal ray of the light flux is separated from the optical axis 135.

FIG. 2 schematically illustrates a main part of the mirror optical system disclosed in U.S. Pat. No. 3,674,334. In this mirror optical system, the center axis itself of the reflecting mirrors is decentered with respect to an optical axis to separate the principal ray of the light flux from the optical axis, thereby solving the problem of eclipse.

The mirror optical system of FIG. 2 includes concave mirror 111, convex mirror 113 and concave mirror 112 in the order of passage of the light flux. These mirrors are originally rotary symmetrical with respect to optical axis 114, as shown by a chain double-dashed line. Only the upper portion of the concave mirror 111 with respect to optical axis 114, only the lower portion of convex mirror 113 with respect to the optical axis, and only the lower portion of concave mirror 112 with respect to optical axis 114 are used to construct an optical system in which a principal ray of light flux from an object is separated from optical axis 114, and the eclipse of light flux 115 is eliminated.

FIG. 3 schematically illustrates a main part of a mirror optical system disclosed in U.S. Pat. No. 5,063,586. In the mirror optical system of FIG. 3, a center axis of the reflecting mirrors itself is also decentered with respect to the optical axis to separate the principal ray of the light flux from the optical axis, thereby solving the problem of eclipse.

Referring to FIG. 3, when a vertical axis of object surface 121 is defined as optical axis 127, center coordinates and center axes (axes connecting centers of reflecting surfaces and centers of curvatures thereof) 122a, 123a, 124a and 125a of the reflecting surfaces of convex mirror 122, concave mirror 123, convex mirror 124 and concave mirror 125 are decentered with respect to optical axis 127. By suitably setting the amount of decentering and the radius of curvature of each surface, the eclipse of light flux 128 from an object due to reflecting mirrors is prevented, so that an object image is efficiently formed on an image surface 126.

These reflecting-type picture taking optical systems contain many parts or components. Thus, in order to obtain a required optical performance, it is necessary that each of the optical parts are accurately assembled. More particularly, according to the picture taking optical system of a type in which reflecting mirrors are decentered with respect to the optical axis for the prevention of an eclipse of the light ray from the object, each of the reflecting mirrors must be disposed with different decentering amounts. As a result, structures for mounting reflecting mirrors thereto become complicated, and extremely precise mounting accuracy is required.

As one of the methods for solving the above problems, a method may be considered in which assembly error of the optical parts is avoided by combining mirror systems into one block.

Hitherto, as examples of such mirror systems, there have been optical prisms such as pentagonal roof prisms and Porro prisms which are used for viewfinder systems, and a color separation prism for separating the light flux from a picture taking lens is separated into three colors of red, green and blue to form object images based on each color of the light on the surface of each image pick-up device.

In these optical prisms, since a plurality of reflecting surfaces are integrated, the reflecting surfaces are placed accurately in relation to one another, so that positions of the reflecting surfaces need not be adjusted.

In these optical prisms, however, there is a problem in that a harmful ghost light associated with an irregular incident light incident from positions and angles other than those of an effective light ray is frequently generated.

A function of the pentagonal roof prism which is often used in a single-lens reflex camera as a typical example of the optical prisms will now be described with reference to FIG. 4. Referring to FIG. 4, there are provided a picture taking lens 101, a quick-return mirror 102, a focal plane 103, a condenser lens 104, the pentagonal roof prism 105, an eyepiece 106, an observer's pupil 107, an optical axis 108 and an image surface 109.

A light flux from an object (not shown) is reflected upward of a camera from the quick-return mirror 102 after passing through the picture taking lens 101 so as to form an image on the focal plane 103 located at a position equivalent to the image surface 109. A condenser lens 104 for forming an exit pupil of the picture taking lens 101 on the observer's pupil is disposed behind the focal plane 103, and the pentagonal roof prism 105 for making an object image on the focal plane 103 into a correct image is disposed behind the condenser lens 104.

The object light which has entered the incident surface 105a of the pentagonal roof prism 105 is subjected to a reversal of an object image from right to left, and then is emitted to the observer's side as the object light by the reflecting surface 105c.

The object light emitted to the observer's side by the reflecting surface 105c passes through an emergent surface 105d of the pentagonal roof prism 105, reaches the eyepiece 106 so as to be formed into a substantially parallel light by a refracting force of the eyepiece 106, and then reaches the observer's pupil 107 so as to be observed.

In the pentagonal roof prism constructed as described above, a ghost light shown by an arrow in FIG. 4 incident at an angle different from that of an effective light is reflected in the order of the roof surface 105b and reflecting surface 105c, is totally reflected from the incident surface 105a, and then is emitted from the lower portion of the emergent surface 105d to the observation side. Since the ghost light differs from the normal effective light ray in the number of reflections, an image turned upside down appears on the lower portion of an observation screen.

In order to remove the ghost light, a light shielding groove 100 is provided in the emergent surface 105d of the pentagonal roof prism 105.

In addition, the overall surface of the prism 105 is covered by black paint except for the incident surface 105a and the emergent surface 105d, whereby a reflecting film to be evaporated onto the roof surface 105b and the reflecting surface 105c is protected from environmental change, such as a change in temperature and humidity, and further, a light ray from the outside of the prism is shielded.

Furthermore, an optical system has been known in which curvature is given to reflecting surfaces of a prism. FIG. 5 schematically illustrates a main part of an observation optical system disclosed in U.S. Pat. No. 4,775,217. This observation optical system is intended to observe scenery of the outer world, and to observe an image displayed on a information display means by superimposing the image on the scenery.

According to this observation optical system, a display light flux 145 emitted from an image displayed on an information display means 141 is reflected from a surface 142 toward the outer world, and enters a half mirror surface 143 having a convex surface. After being reflected from the surface of the half mirror surface 143, the display light flux 145 is made into a substantially parallel light flux by the concave half mirror surface 143, and forms an enlarged virtual image of the displayed image after being refracted and passing through the surface 142, and then enters an observer's pupil 144 so as to allow the observer to recognize the displayed image.

On the other hand, a light flux 146 from the outer world enters a surface 147 which is substantially parallel to the reflecting surface 142, and is refracted therefrom so as to reach the concave half mirror surface 143. A semi-transmission film is evaporated onto the concave half mirror surface 143, and a part of the light flux 146 passes through the concave half mirror surface 143 and enters the observer's pupil 144 after being refracted and passing through the surface 142, whereby the observer visually recognizes the displayed image by superimposing it on the scenery of the outer world.

FIG. 6 schematically illustrates a main part of an observation optical system disclosed in Japanese Unexamined Patent Publication No. 2-297516. This observation optical system is also intended to observe scenery of the outer world, and to observe an image displayed on a information display means by superimposing the image on the scenery.

According to this observation optical system, a display light flux 154 emitted from an information display means 150 passes through a plane 157 constituting a prism Pa and enters a parabolic reflecting surface 151. The display light flux 154 is reflected from the reflecting surface 151 to become a convergent light flux, and forms an image on a focal plane 156. At this time, the display light flux 154, reflected from the reflecting surface 151, has reached the focal plane 156 while being totally reflected between two parallel planes 157 and 158 which constitute the prism Pa, whereby a totally slim optical system can be obtained.

The display light flux 154 emitted as a divergent light from the focal plane 156 enters a half mirror 152 having a parabolic surface after being totally reflected between the planes 157 and 158, and is reflected from the surface of the half mirror 152. At the same time, the light flux 154 forms an enlarged virtual image of the displayed image by a reflecting force of the half mirror 152 and becomes a substantially parallel light flux, and then passes through the surface 157 to enter the observer's pupil 153, thereby allowing the observer to recognize the displayed image.

On the other hand, a light flux 155 from the outer world passes through a surface 158b constituting a prism Pb, the half mirror 152 and the surface 157, and then enters the observer's pupil 153. The observer virtually recognizes the displayed image by superimposing it on the scenery of the outer world.

The principal function of the conventional optical prism such as the pentagonal roof prism is to reverse an image by changing the direction in which a light ray travels. Therefore, the reflecting surfaces of the optical prism are commonly formed by planes alone, and the optical prism does not impart curvatures to the reflecting surfaces, and positively correct aberration on the reflecting surfaces.

In the observation optical systems disclosed in U.S. Pat. No. 4,775,217 and Japanese Unexamined Patent Publication No. 2-297516, a semi-transmission film is used in order to observe a displayed image and recognize an object image, which reduces a transmission light amount of the displayed image. Therefore, as described above, a method is commonly adopted in which total reflecting surfaces are used in order to minimize the loss of the light amounts on each of the reflecting surfaces.

The total reflecting surfaces are often formed by planes alone to simplify construction. From the viewpoint of correcting aberration, however, it is desirable that the reflecting surfaces are also formed into curved surfaces to optimally correct aberration.

However, when total reflecting conditions are to be satisfied with respect to all light rays entering the reflecting surfaces, there is no degree of freedom of the shapes of the reflecting surfaces, so that the aberration is not efficiently corrected on the reflecting surfaces.

SUMMARY OF THE INVENTION

It is an object of the present invention to evaporate an antireflection film onto incident and emergent surfaces of an optical element which includes an integrally-formed plurality of reflecting surfaces, each having a curvature for effectively correcting aberration, and to minimize the reduction in a transmission light amount of the overall optical element.

In order to achieve the above object, an optical element of the present invention in which an incident surface into which light flux from an object enters, a plurality of reflecting curved surfaces which reflect the incident light entered from the incident surface and are decentered one to the other, and an emergent surface from which the light flux from the plurality of curved surfaces is emitted are integrally formed, is characterized in that an antireflection film is applied onto the incident surface and the emergent surface when forming an object image on a predetermined surface.

More particularly, the optical element of the present invention preferably has the following characteristics:

A reflecting film is formed on the reflecting curved surfaces, and the range of formation of the reflecting film is substantially equal to a range where the light flux forming an image on an image forming surface enters the reflecting surfaces;

Portions other than the range of formation of the reflecting film are diffusing surfaces;

A protective layer is provided on the reflecting film formed on the reflecting surfaces; and The protective films are painted black.

DETAILED DESCRIPTION OF THE PREFERRED EMBODIMENT

Before describing the preferred embodiment, various components in the embodiment and common facts through the embodiment will be described.

Figure 7:
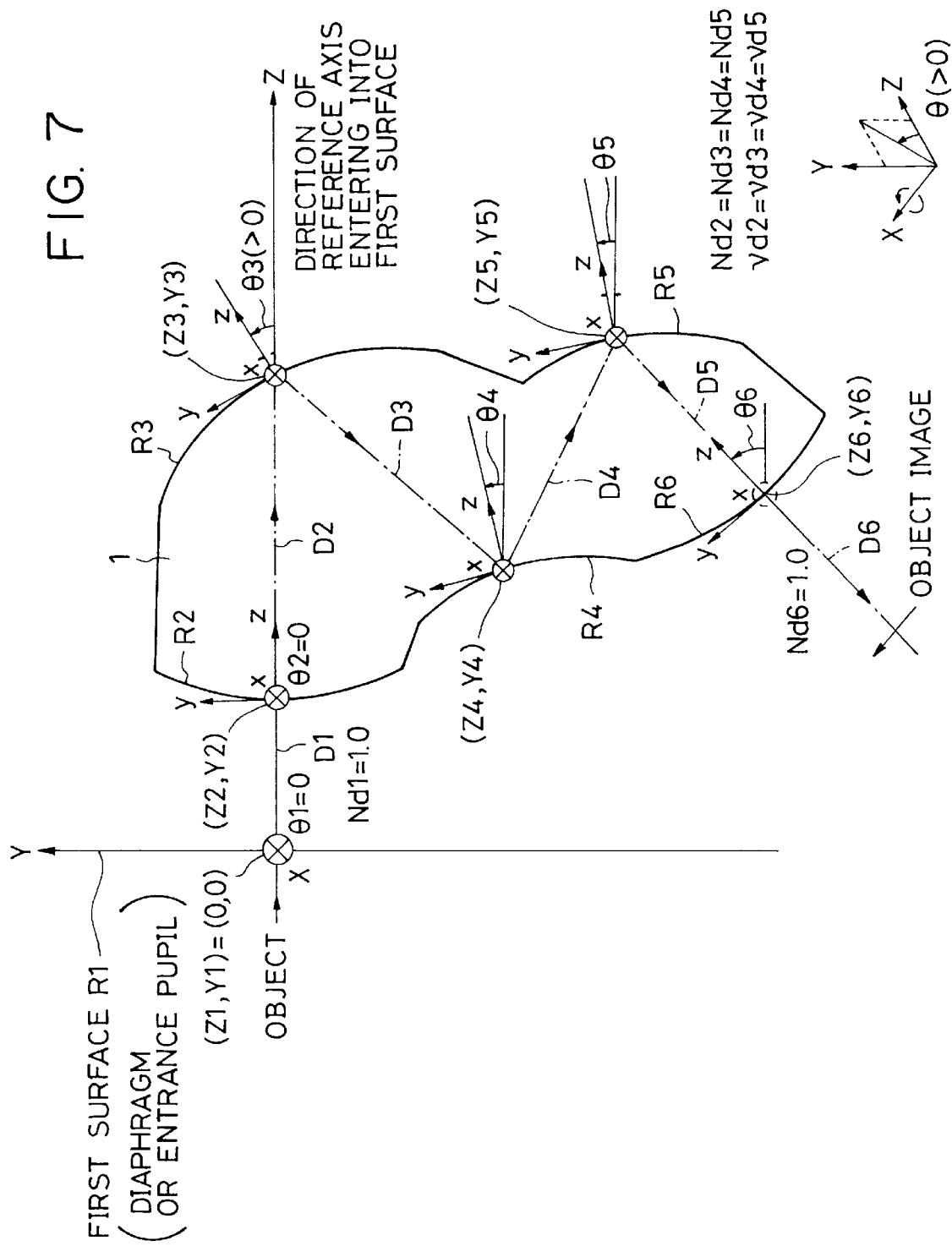
FIG. 7 illustrates a coordinate system which defines data of components of an optical element of the present invention.

FIG. 7 illustrates a coordinate system which defines data of components of an optical element of the present invention. In the embodiment, the i-th surface along a light ray (which is shown by dashed line in FIG. 7, and is referred to as a reference axis light ray) travelling from an object to an image surface is defined as the i-th surface.

In FIG. 7, the first surface R1 is a diaphragm, the second surface R2 is a refracting surface (incident surface) which is co-axial with the first surface, the third surface R3 is a reflecting surface tilted with respect to the second surface R2, the fourth and fifth surfaces R4 and R5 are reflecting surfaces which are tilted and shifted with respect to the front surfaces thereof, respectively, and the sixth surface R6 is a refracting surface (emergent surface) which is shifted and tilted with respect to the fifth surface R5. The second to sixth surfaces R2 to R6 are constructed on one optical element which is formed by a medium, such as glass and plastic, and illustrated as the optical element 1 in FIG. 7. Two refracting surfaces (the incident surface and the emergent surface) and at least three reflecting surfaces of curved surfaces are integrally formed in the optical element 1 of the present invention.

Therefore, according to the construction of FIG. 7, a medium from the object surface (not shown) to the second surface R2 is air, a medium from the second surface R2 to the sixth surface R6 is a certain common medium, and a medium from the sixth surface R6 to the seventh surface R7 (not shown) is air.

Since the optical system of the present invention is a decentered optical system, each of the surfaces constituting the optical system do not have a common optical axis. Thus, in the embodiment of the present invention, an absolute coordinate system is first established in which a center of an effective diameter of the first surface is defined as an origin.

In addition, in the embodiment of the present invention, the center point of the effective diameter of the first surface is defined as the origin, and a path of a light ray (the reference axis light ray) passing through the origin and the center of a final image forming surface is defined as a reference axis of the optical system. Further, the reference axis in the embodiment of the present invention has its own direction. The direction is one in which the reference axis light ray travels for forming an image.

Although the reference axis of the optical system is established as described above, the most convenient axis may be determined as the reference axis from the viewpoint of optical design, arrangement of eccentric aberration or expression of the shape of each surface of the optical system. However, the path of the light ray passing through any one of the diaphragm or entrance pupil, exit pupil, the center of the first surface of the optical system and the final image forming surface is commonly defined as the reference axis.

That is, in the embodiment of the present invention, the path in which the light ray passing through the center point of the effective diameter of the first surface, i.e., diaphragm surface, to the center of the final image forming surface is refracted and reflected by refracting and reflecting surfaces is established as the reference axis. The surfaces are arranged in the order in which the reference axis is to be refracted or reflected.

Therefore, the reference axis finally reaches the center of the image surface while changing its direction following a law of refraction or reflection in accordance with the set order of the surfaces.

All of the tilted surfaces constituting the optical system of the embodiment of the present invention are basically tilted within the same surface. Thus, each of the axes of the absolute coordinate system are defined as follows:

Z-axis: the reference axis passing through the origin, and extending toward the second surface R2;

Y-axis: a straight line passing through the origin, and forming 90° in a counterclockwise direction with the Z-axis within the tilted surface (within the surface of FIG. 7); and X-axis: a straight line passing through the origin, and perpendicular to the z-axis and y-axis (a straight line perpendicular to the surface of FIG. 7).

In addition, when expressing the shape of the i-th surface constituting the optical system, the shape can be understood more easily by establishing a local coordinate system in which the intersection of the reference axis and the i-th surface is defined as the origin to express the shape of the surface by the local coordinate system, rather than by expressing the shape of the i-th surface by the absolute coordinate system. Therefore, in the embodiment expressing data of components of the present invention, the shape of the i-th surface is expressed by the local coordinate system.

In addition, a tilt angle within the YZ plane of the i-th surface is expressed by an angle θi (unit: degree) in which an angle in the counterclockwise direction with respect to the Z-axis of the absolute coordinate system is taken as a positive angle. Therefore, in the embodiment of the present invention, the origins of the local coordinate systems of each of the surfaces are on the YZ plane in FIG. 7. Further, there is no decentering of surfaces within the XZ plane and the XY plane. Still further, the y-axis and z-axis of the local coordinate (x, y, z) of the i-th surface are tilted at the angle θi with respect to the absolute coordinate system within the YZ plane. More specifically, each of the axes of the local coordinate system are defined as follows:

z-axis: a straight line passing through the origin of the local coordinate system, and forming an angle θi in the counterclockwise direction with the Z-direction of the absolute coordinate system within the YZ plane;

y-axis: a straight line passing through the origin of the local coordinate system, and forming 90° in a counterclockwise direction with the z-direction within the YZ plane; and x-axis: a straight line passing through the origin of the local coordinate system, and perpendicular to the YZ plane.

Accordingly, as shown in FIG. 7, the center point of the effective diameter of the first surface R1 is labelled (Z1, Y1), and is defined as the origin (0, 0). The angle θ1=0. Along surface R2, the origin of the local coordinate system is identified as (Z2, Y2), and θ2=0. Along surface R3, the origin of the local coordinate system is labelled (Z3, Y3), and θ3>0. Likewise, along surface R4, the origin of the local coordinate system is labelled (Z4, Y4), and θ4>0. Along surface R5, the origin of the local coordinate system is labelled (Z5, Y5), and θ5>0. Finally, along surface R6, the origin of the local coordinate system is labelled (Z6, Y6), and θ6>0.

Figure 1:
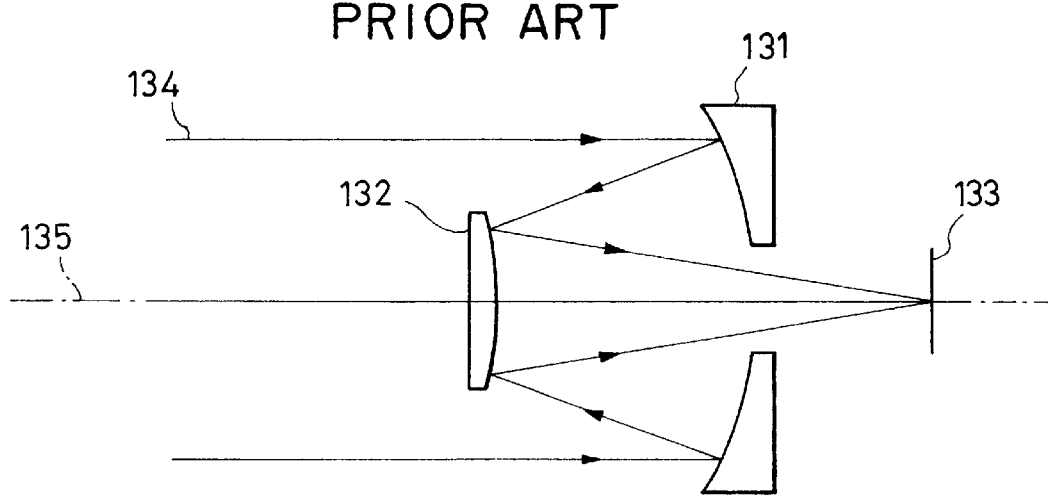
FIG. 1 schematically illustrates a main part of a conventional mirror optical system.
Figure 2:
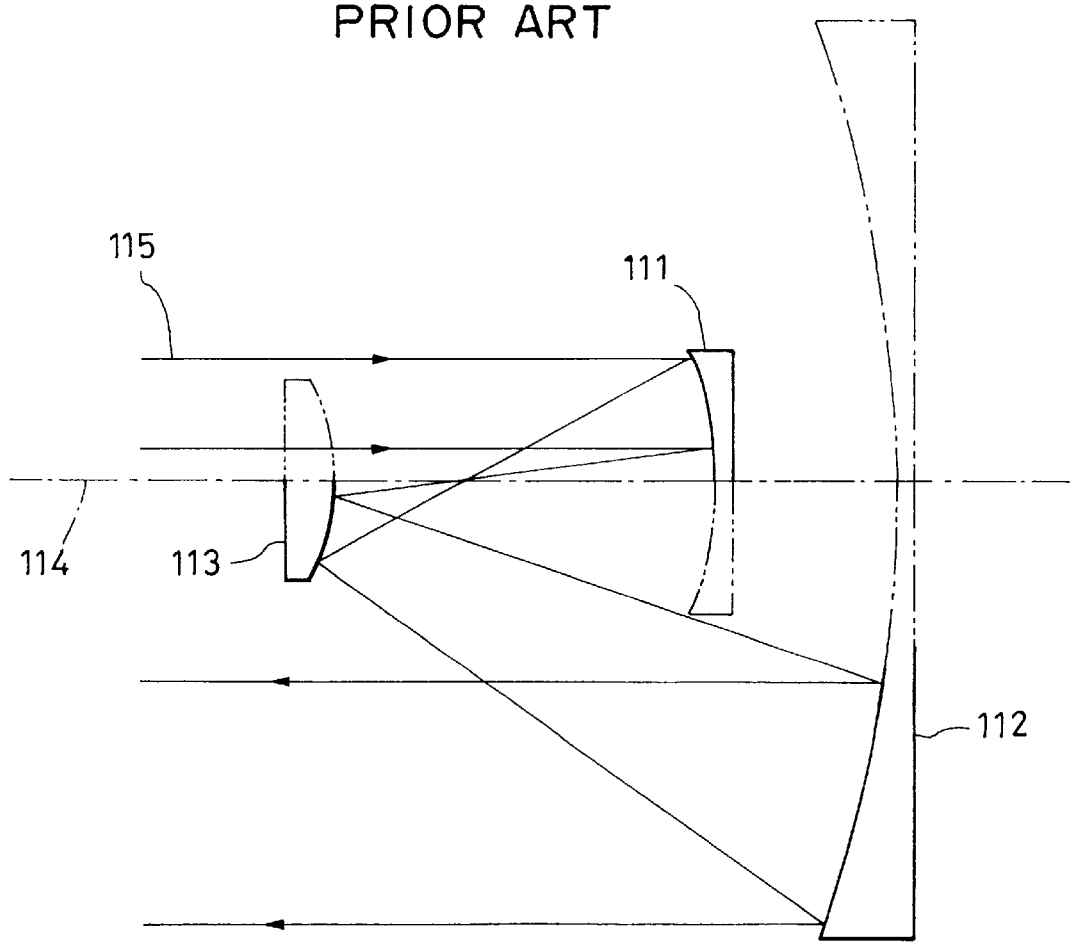
FIG. 2 schematically illustrates a main part of another conventional mirror optical system.
Figure 3:
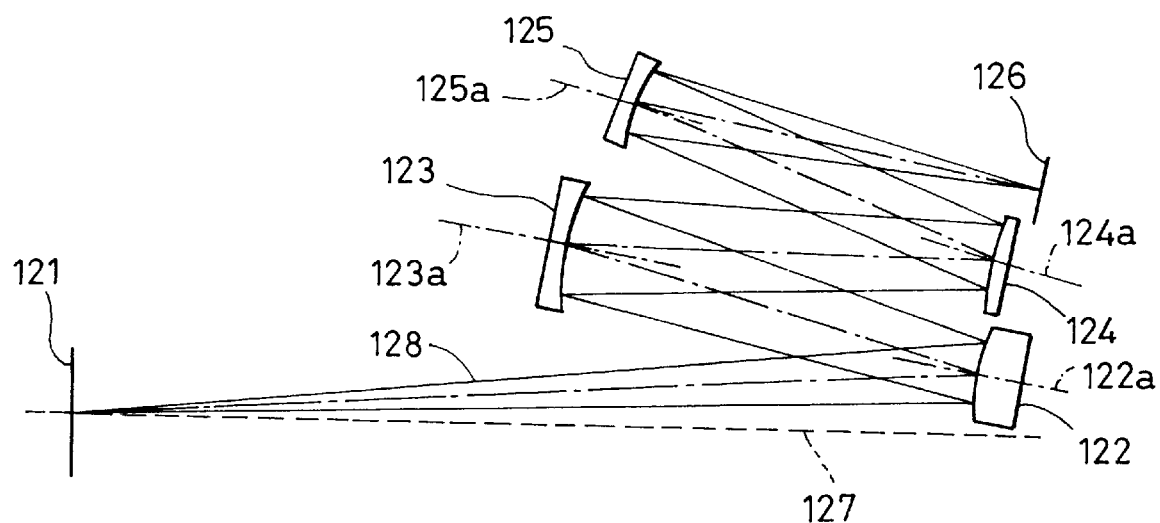
FIG. 3 schematically illustrates a main part of still another conventional mirror optical system.
Figure 4:
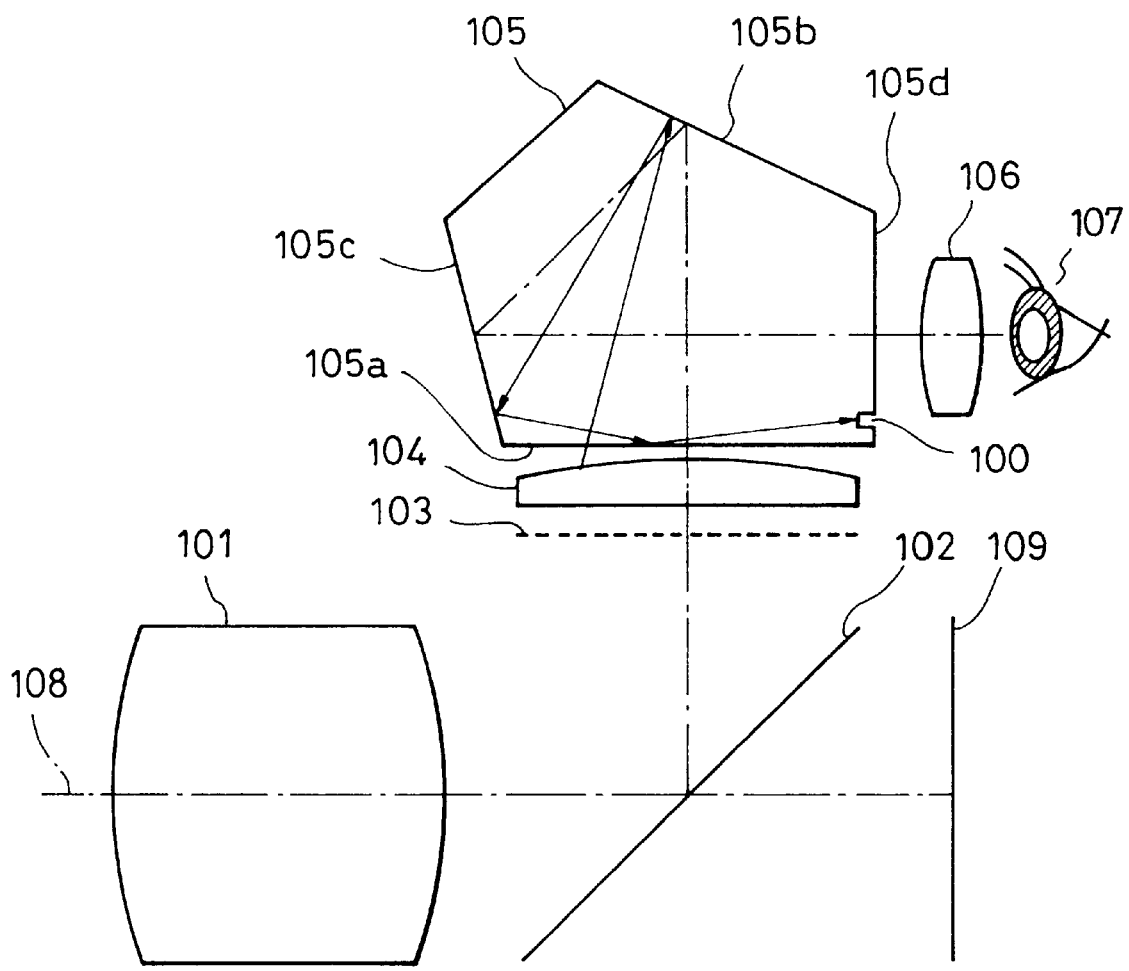
FIG. 4 illustrates a conventional pentagonal roof prism.
Figure 5:
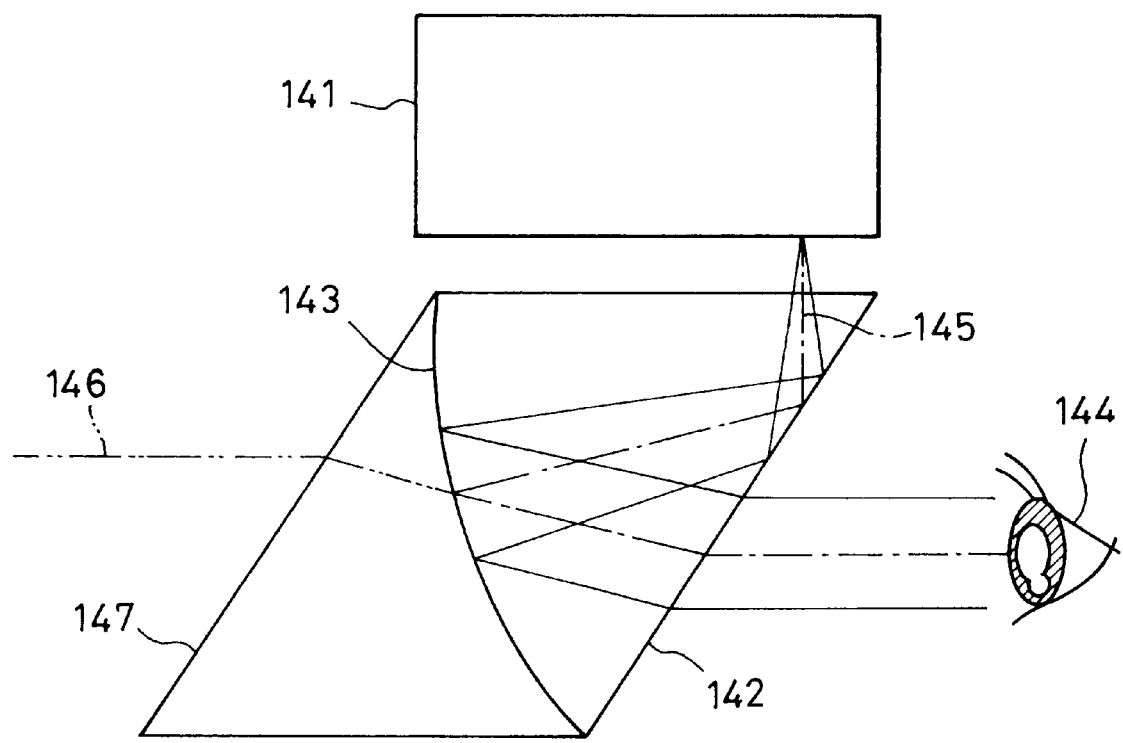
FIG. 5 schematically illustrates a main part of a conventional observation optical system.
Figure 6:
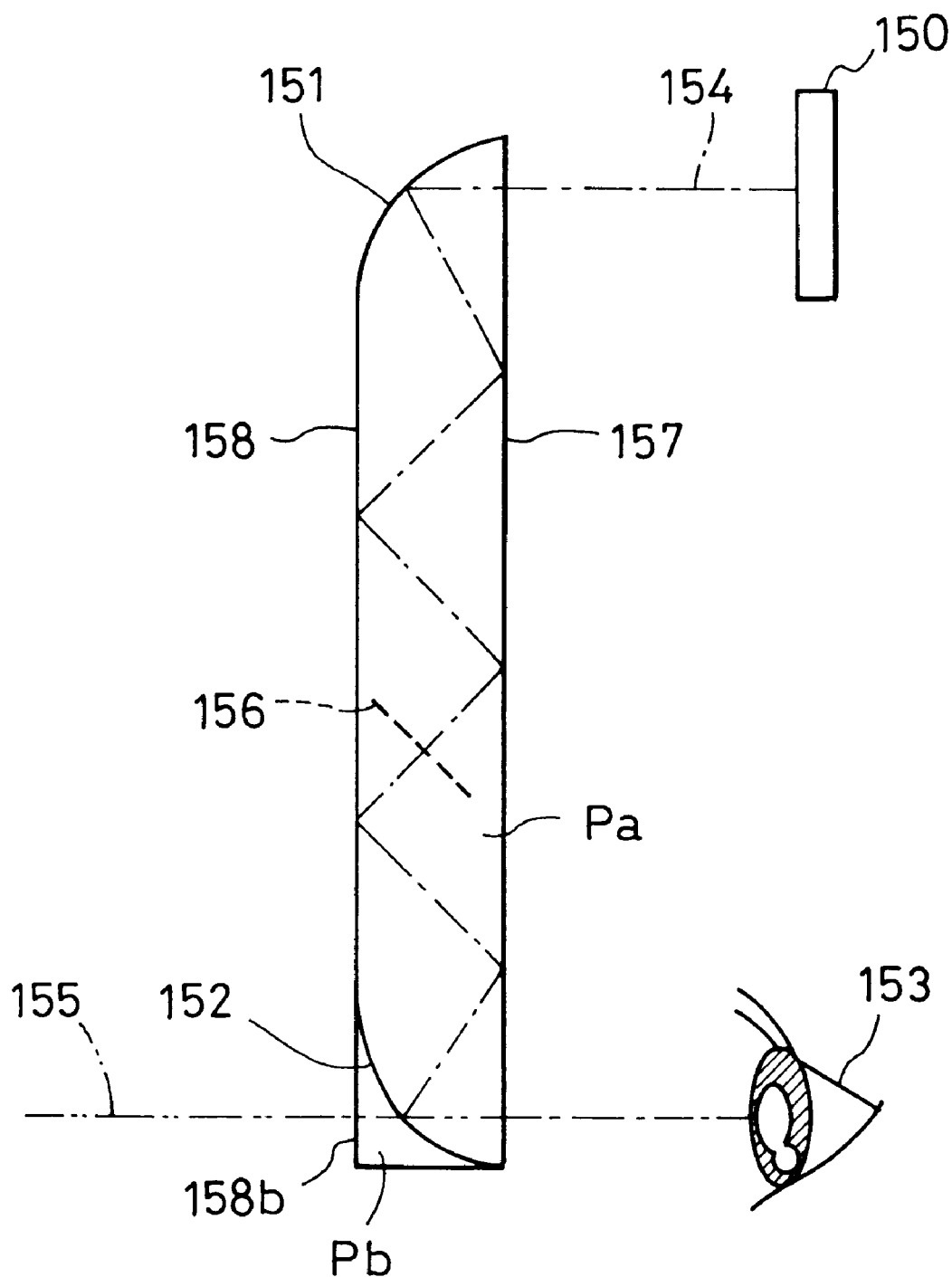
FIG. 6 schematically illustrates a main part of another conventional observation optical system.

In addition, Di (D1–D6 in FIG. 1) is a scaler amount representing a spacing between the origins of the local coordinates of the i-th surface and the (i+1)-th surface, and Ndi and vdi are refractive index and Abbe number of a medium between the i-th surface and the (i+1)-th surface, respectively. As shown in FIG. 7, the refractive indices Nd2 through Nd5 are equal to one another. Likewise, Abbe numbers vd2 through vd5 are equal to each other. Refractive indices Nd1 and Nd6=1, as the medium there is air.

Optical active surfaces in the embodiment of the present invention are of spherical surfaces and of rotary asymmetrical aspheric surfaces. A radius of curvature of the spherical surface portion is referred to as $r_i$. When the center of curvature is on the side of the first surface along the reference axis (dashed line in FIG. 7) travelling from the surface to the image surface, the sign of the radius of curvature $r_i$ is negative, whereas the sign of the same is positive when the center of curvature is on the side of the image forming surface.

The spherical surface has the shape represented by the following expression (1):

$$z = \frac{(x^2 + y^2)/r_i}{1 + \{1 - (x^2 + y^2)/r_i^2\}^{1/2}} \quad (1)$$

In addition, the optical system of the present invention includes at least one rotary asymmetrical aspheric surface, and the shape thereof is represented by the following expression (2):

Letting $A = (a+b) \cdot (y^2 \cdot \cos^2 t + x^2)$ $B = 2a \cdot b \cdot \cos t [1 + \{(b-a) \cdot y \cdot \sin t/2a \cdot b\} + [1 + \{(b-a) \cdot y \cdot \sin t/(a \cdot b)\} - \{y^2/(a \cdot b)\} -$ $\{4a \cdot b \cdot \cos^2 t + (a+b)^2 \sin^2 t\} x^2/(4a^2 b^2 \cos^2 t)]^{1/2}]$ wherein A and B are variables; a, b, and t are constant, $z = A/B + C_{02}y^2 + C_{20}x^2 + C_{03}y^3 + C_{21}x^2y + C_{04}y^4 + C_{22}x^2y^2 + C_{40}x^4 \quad (2)$ wherein Cnm is a constant.

Since the above expression includes odd number order terms in relation to x, the curved surface defined by the above expression has a shape symmetrical with respect to a yz plane. In addition, if the following condition is satisfied, the curved surface exhibits the shape symmetrically with respect to an xz plane:

$C_{03} = C_{21} = 0$, and $t = 0$.

Further, if a condition $C_{02} = C_{20}$ $C_{04} = C_{40} = C_{22}/2$ is satisfied, the curved surface exhibits a rotary symmetrical shape. When the above conditions are not satisfied, the curved surface exhibits a rotary asymmetrical shape.

Incidentally, in the embodiment of the present invention, a condition $C_{02} = C_{20} = 0$ is satisfied, and a high order asymmetrical aspheric shape is added to a basic shape of the second order curved surface.

In the embodiment of the present invention, as shown in FIG. 7, the first surface is a diaphragm. In addition, a horizontal half angle of view uy means a maximum angle of view of a light flux entering into the diaphragm R1 within the YZ plane of FIG. 7, and a vertical half angle of view $u_x$ means a maximum angle of view of the light flux entering into the diaphragm R1 within the XZ plane. Further, the diameter of the diaphragm R1 (first surface) is indicated as the diaphragm diameter. This is related to brightness of the optical system. Since the entrance pupil is located on the first surface, the diameter of the diaphragm is equal to the diameter of the entrance pupil.

An effective range of an image on the image surface is indicated as an image size. The image size is represented by a rectangular region in which the size in the y-direction is taken as a horizontal size, and the size in the x-direction is taken as a vertical size.

In the embodiment of the present invention, the size of the optical system is also indicated, which is defined by the effective diameter of the first surface.

Figure 8:
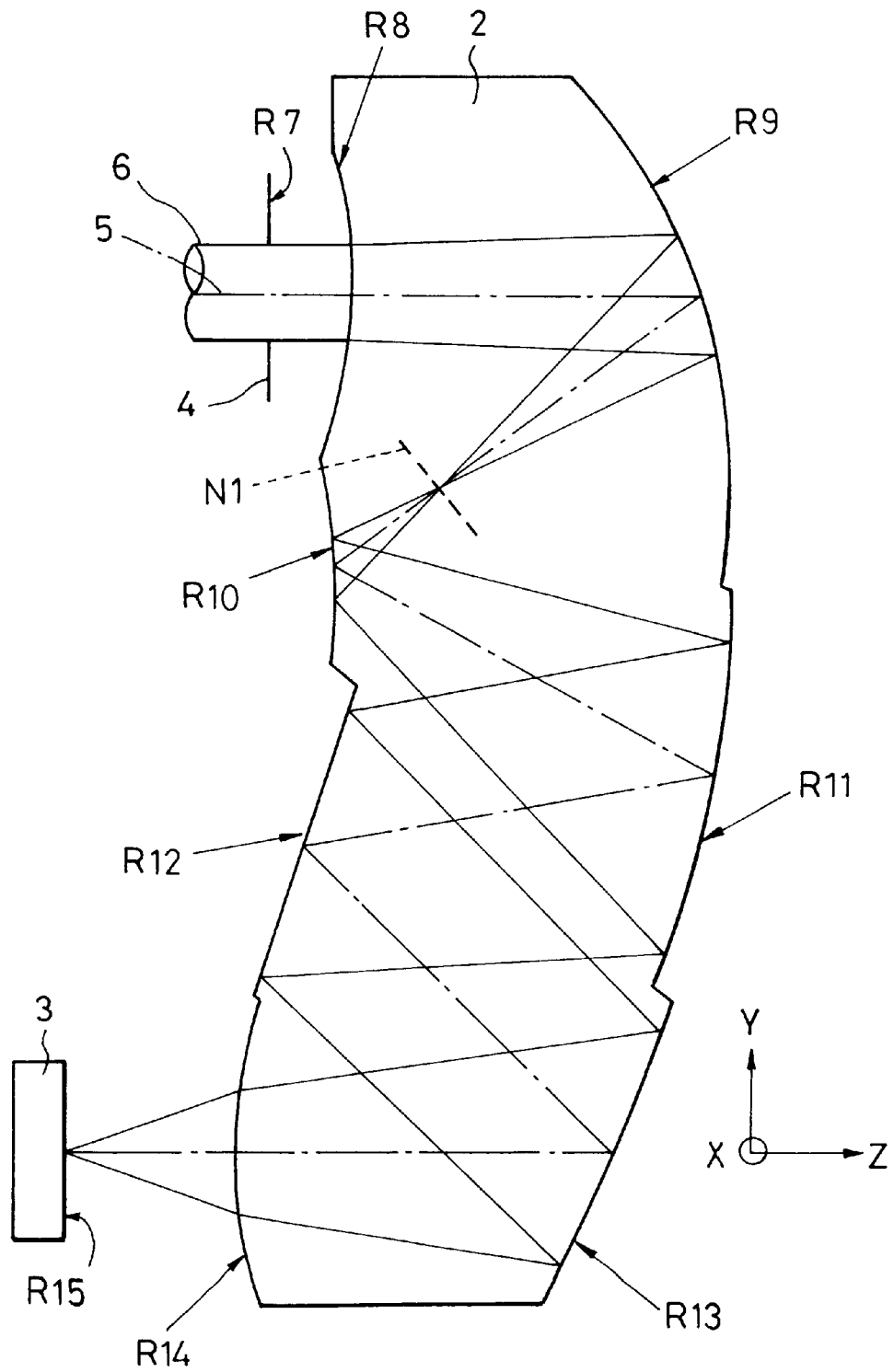
FIG. 8 schematically illustrates a main part of an optical element according to an embodiment of the present invention.

FIG. 8 schematically illustrates a main part of an optical apparatus according to an embodiment of the present invention. The drawing is a sectional view within the YZ plane, and also shows an optical path of an axial light flux. Referring to FIG. 8, an optical element 2 has an integrally formed plurality of reflecting surfaces each having a curvature. The optical element 2 is composed of, in the order from an object, a concave refracting surface (incident surface) R8, five reflecting surfaces of a concave mirror R9, a convex mirror R10, a concave mirror R11, a convex mirror R12 and a concave mirror R13, and a convex refracting surface (emergence surface) R14, and the direction of the reference axis entering into the optical element 2 and the direction of the reference axis emitted from the optical element 2 are parallel and opposite to each other. Numeral 3 denotes an image pick-up device such as CCD, and R15 denotes a light receiving surface thereof. A diaphragm 4 (R7) is disposed on the object side of the optical element 2, and numeral 5 denotes the reference axis of the optical element 2. Both of the refracting surfaces are formed into a rotary symmetrical spheric shape, and all of the reflecting surfaces are anamorphic surfaces which are symmetrical with respect to the YZ surface.

Numeric data of this embodiment will now be shown below. In the numeric data, for example, "e-03" represents "multiple by $10^{-3}$". This embodiments is directed to a picture taking optical system of a horizontal angle of view of 63.4° and a vertical angle of view of 49.6°.

Horizontal half angle of view: 31.7°

Vertical half angle of view: 24.8°

Diameter of diaphragm: 2.0 mm

Image size: 4 mm (horizontal)×3 mm (vertical)

Size of optical system (X×Y×Z)=9.0×26.3×15.2

| | Yi | Zi | θi (°) | Di (mm) | Ndi | vdi | |
|---|---|---|---|---|---|---|---|
| R7 | 0.00 | 0.00 | 0.00 | 1.82 | 1 | | diaphragm |
| R8 | 0.00 | 1.82 | 0.00 | 7.49 | 1.58310 | 30.20 | refracting surface |
| R9 | 0.00 | 9.30 | 18.49 | 9.86 | 1.58310 | 30.20 | reflecting surface |
| R10 | −5.93 | 1.43 | 3.23 | 9.30 | 1.58310 | 30.20 | reflecting surface |
| R11 | −10.65 | 9.44 | −12.55 | 8.90 | 1.58310 | 30.20 | reflecting surface |
| R12 | −11.50 | 0.58 | −22.91 | 9.39 | 1.58310 | 30.20 | reflecting surface |
| R13 | −18.82 | 6.46 | −25.63 | 8.02 | 1.58310 | 30.20 | reflecting surface |
| R14 | −18.82 | −1.56 | −0.01 | 3.68 | 1 | | refracting surface |
| R15 | −18.82 | −5.24 | −0.01 | 0.00 | 1 | | image surface |

Spherical Shape

| | $r_i$(mm) |
|---|---|
| R7 | ∞ |
| R8 | −7.648 |
| R14 | 10.757 |
| R15 | ∞ |

Aspherical Shape

R9

$a = -1.09716e + 01$  $b = -1.25390e + 01$  $t = 2.15145e + 01$
$C_{02} = 0.$  $C_{20} = 0.$
$C_{03} = 6.87152e - 05$  $C_{21} = -1.21962e - 04$
$C_{04} = 3.59209e - 05$  $C_{22} = 1.02173e - 04$  $C_{40} = 4.95588e - 05$

R10

$a = -2.34468e + 00$  $b = 4.88786e + 00$  $t = -3.56094 + 01$
$C_{02} = 0.$  $C_{20} = 0.$
$C_{03} = -4.48049e - 03$  $C_{21} = -7.45433e - 03$
$C_{04} = 1.81003e - 03$  $C_{22} = 2.09229e - 03$  $C_{40} = -8.28024e - 04$

R11

$a = -6.11985e + 00$  $b = 1.70396e + 01$  $t = -2.17033e + 01$
$C_{02} = 0.$  $C_{20} = 0.$
$C_{03} = -3.23467e - 04$  $C_{21} = -1.07985e - 03$
$C_{04} = -3.70249e - 05$  $C_{22} = -1.74689e - 04$  $C_{40} = -1.21908e - 04$

R12

$a = \infty$  $b = \infty$  $t = 0.$
$C_{02} = 0.$  $C_{20} = 0.$
$C_{03} = 1.10097e - 03$  $C_{21} = -3.73963e - 04$
$C_{04} = -1.59596e - 04$  $C_{22} = -3.22152e - 04$  $C_{40} = -1.74291e - 04$

R13

$a = -2.11332e + 01$  $b = -1.31315e + 03$  $t = 1.70335e + 00$
$C_{02} = 0.$  $C_{20} = 0.$
$C_{03} = 8.29145e - 05$  $C_{21} = -1.11374e - 03$
$C_{04} = -2.50522e - 05$  $C_{22} = -5.28330e - 05$  $C_{40} = -2.91711e - 05$

An image forming operation of this embodiment will now be described. An incident light amount of axial light flux 6 entering along the reference axis 5 is regulated by the diaphragm 4 (R7), and then enters the concave refracting surface R8 of the optical element 2. The light flux 6 which has entered the concave refracting surface R8 is emitted as a divergent light flux by a power of the concave refracting surface R8, is reflected from the concave mirror R9, and primarily forms an object image on an intermediate image forming surface N1 by a power of the concave mirror R9. By forming the object image within the optical element 2 in the early stage as described above, an increase in the effective diameters of the surfaces disposed closer to the image side than to the diaphragm 4 is retarded.

The light flux 6 which has primarily formed the image on the intermediate image forming surface N1 reaches the convex refracting surface R14 while being reflected from the convex mirror R10, concave mirror R11, convex mirror R12 and concave mirror R13 to undergo optical actions due to the powers of the reflecting mirrors, and then the light flux 6 is refracted by the power of the convex refracting surface R14 so as to form an object image on the light receiving surface R15.

Thus, in the optical element 2, the light flux reaches the light receiving surface R15 by repeating refraction by the incident and emergent surfaces, and reflection by a plurality of reflecting mirrors each having a curvature, so that the optical element 2 serves as a lens unit having desired optical performance and a positive power overall.

In this embodiment, the direction of the reference axis entering the optical element 2 and that emitting therefrom are parallel and opposite to each other. In addition, all of the reference axes including the incident reference axis and emergent reference axis are given in FIG. 8 (on the YZ plane).

In this embodiment, an antireflection film is evaporated onto the refracting surfaces of the optical element 1 constructed as described above, and a reflecting film is evaporated onto a suitable range of the reflecting surfaces of the same so as to minimize a reduction in transmission light amount of the whole optical element.

This matter will be described. The transmission light amount of the overall optical element can be generally represented by the following expression:

Transmission light amount={(reflectance of the reflecting surface)(number of reflecting surfaces)}×{(transmittance of the transmission surface)(number of transmission surfaces)} wherein the power exponent**represents the number of reflecting surfaces.

In this embodiment, five reflecting surfaces and two transmission surfaces are included. For example, if the reflectance of the reflecting surface is 95%, and the transmittance of the transmission surface is 98%, the transmission light amount in this embodiment is obtained by the following expression:

Transmission light amount=$0.95^5 \times 0.98^2 = 0.74$

Thus, the ratio of the emergent light amount to the incident light amount is 74%.

If it is required to increase the above transmission light amount further, the reflecting surfaces are set so as to satisfy a total reflection condition while optimizing the shapes of some reflecting surfaces.

Figure 9:
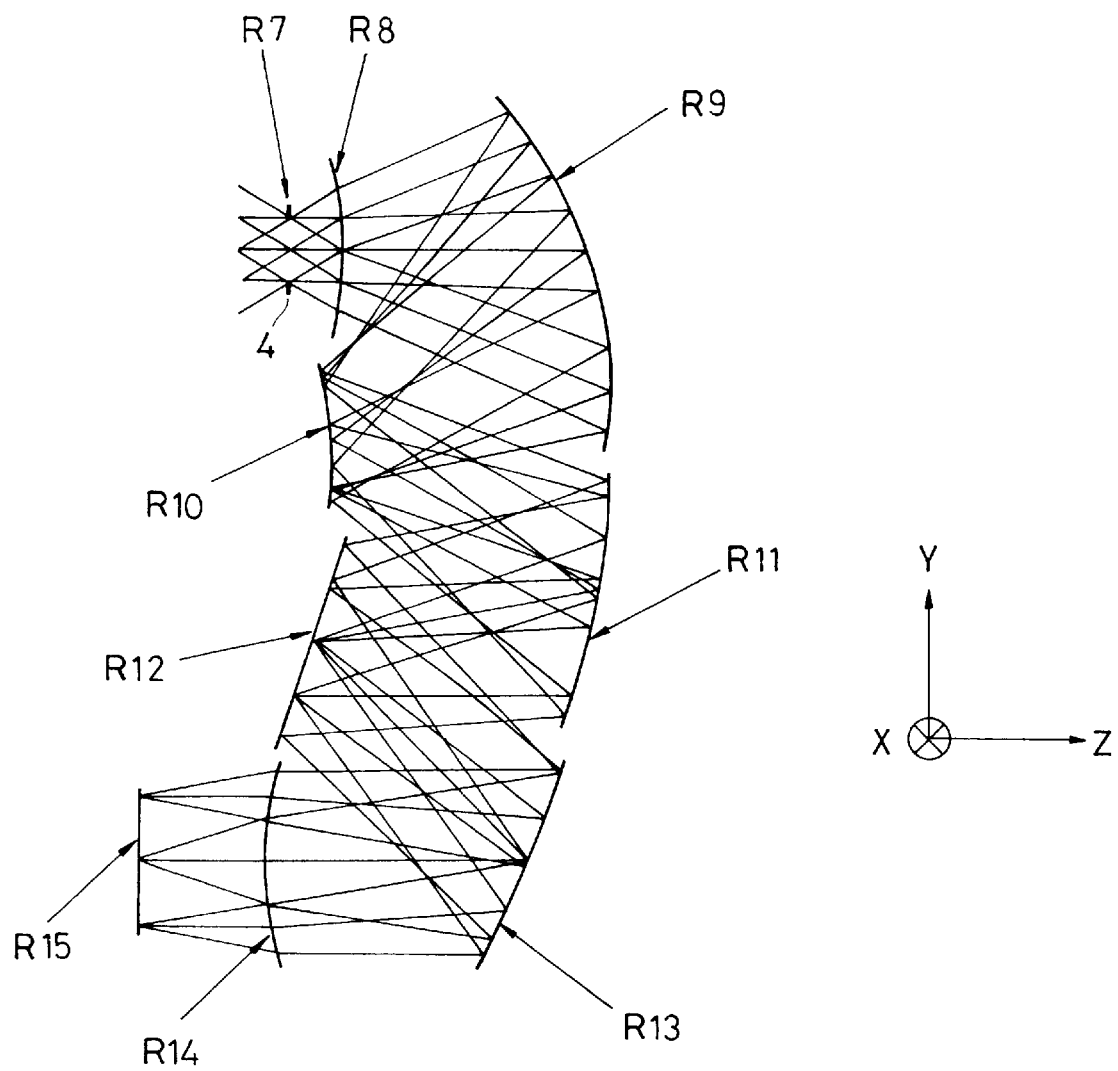
FIG. 9 illustrates optical paths according to the embodiment of the present invention.

FIG. 9 illustrates optical paths of this embodiment. FIG. 10 to 16 are distribution charts (light rays distribution charts) each showing a distribution of incident points of the incident light entering into each of the surfaces obtained when tracing light rays with respect to axial point and abaxial points in this embodiment. Incidentally, the light ray which forms an image on the light receiving surface R9 is hereinafter referred to as an image forming light ray.

Figure 10:
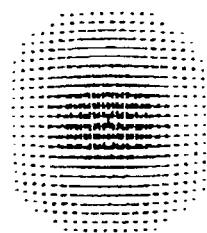
FIG. 10 is a light ray distribution chart on a concave refracting surface R8 according to the embodiment of the present invention.
Figure 13:
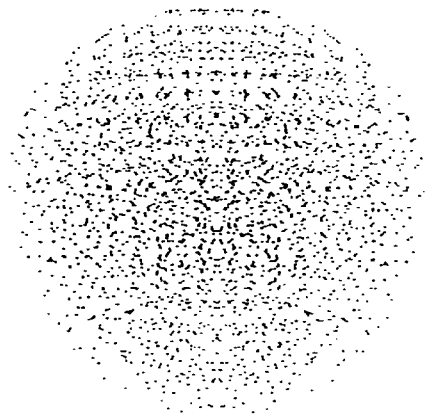
FIG. 13 is a light ray distribution chart on a concave mirror R11 according to the embodiment of the present invention.
Figure 14:
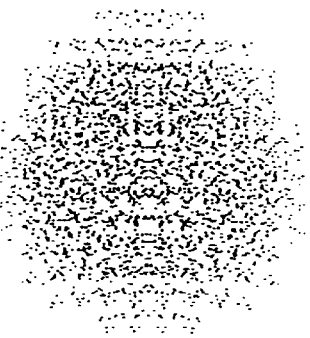
FIG. 14 is a light ray distribution chart on a convex mirror R12 according to the embodiment of the present invention.
Figure 15:
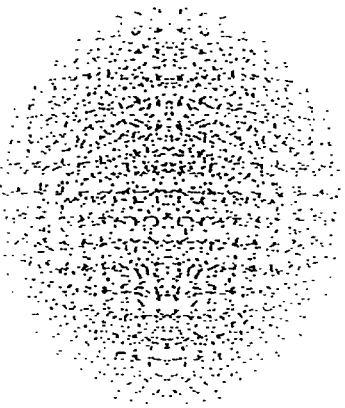
FIG. 15 is a light ray distribution chart on a concave mirror R13 according to the embodiment of the present invention.

FIG. 10 is a light ray distribution chart of the incident points of the light ray on the concave refracting surface R8, shown in FIG. 9. In FIG. 10, the incident points are substantially distributed within a circle with reflecting the shape of the diaphragm 4 (R7). FIG. 14 is a light rays distribution chart of the incident points on the convex mirror R12 near a pupil image forming surface. In FIG. 14, the incident points are substantially distributed within a circle reflecting the shape of the pupil. On the other hand, FIGS. 13 and 15 are light ray distribution charts of the incident points on the concave mirrors R11 and R13 apart from the pupil image forming surface, respectively. In these drawings, the incident points are distributed within an ellipse deviated from the circular shape.

Figure 11:
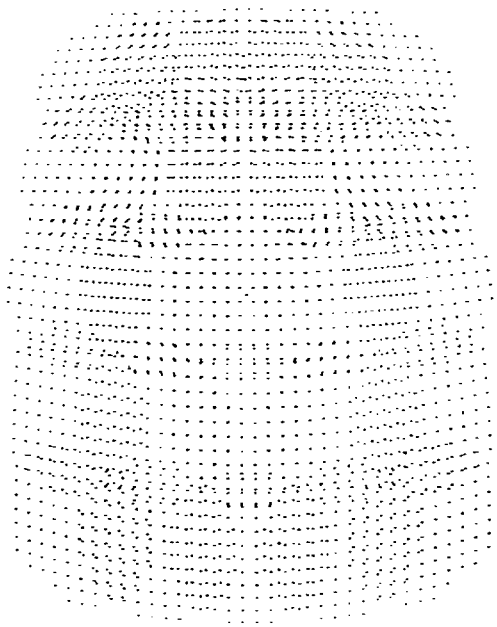
FIG. 11 is a light ray distribution chart on a convex mirror R9 according to the embodiment of the present invention.
Figure 12:
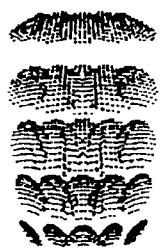
FIG. 12 is a light ray distribution chart on a convex mirror R10 according to the embodiment of the present invention.
Figure 16:
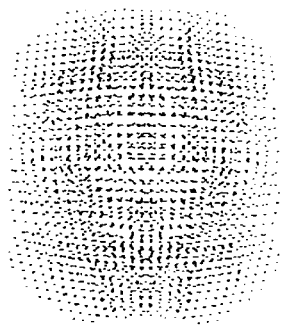
FIG. 16 is a light ray distribution chart on a concave refracting surface R14 according to the embodiment of the present invention.

FIG. 12 is a light ray distribution chart of the incident points on the convex mirror R10 near the primary image forming surface, and FIG. 16 is a light ray distribution chart of the incident points on the convex refracting surface R14. In these drawings, the incident points are distributed within a rectangle reflecting the shape of the light receiving surface R15. FIG. 11 is a light ray distribution chart of the incident points on the concave mirror R9. In FIG. 11, the incident points are distributed within a trapezoid.

Thus, the optical element 2 includes the integrally-formed reflecting surfaces and refracting surfaces each exhibiting different shape of the light ray distribution thereon.

Figure 17:
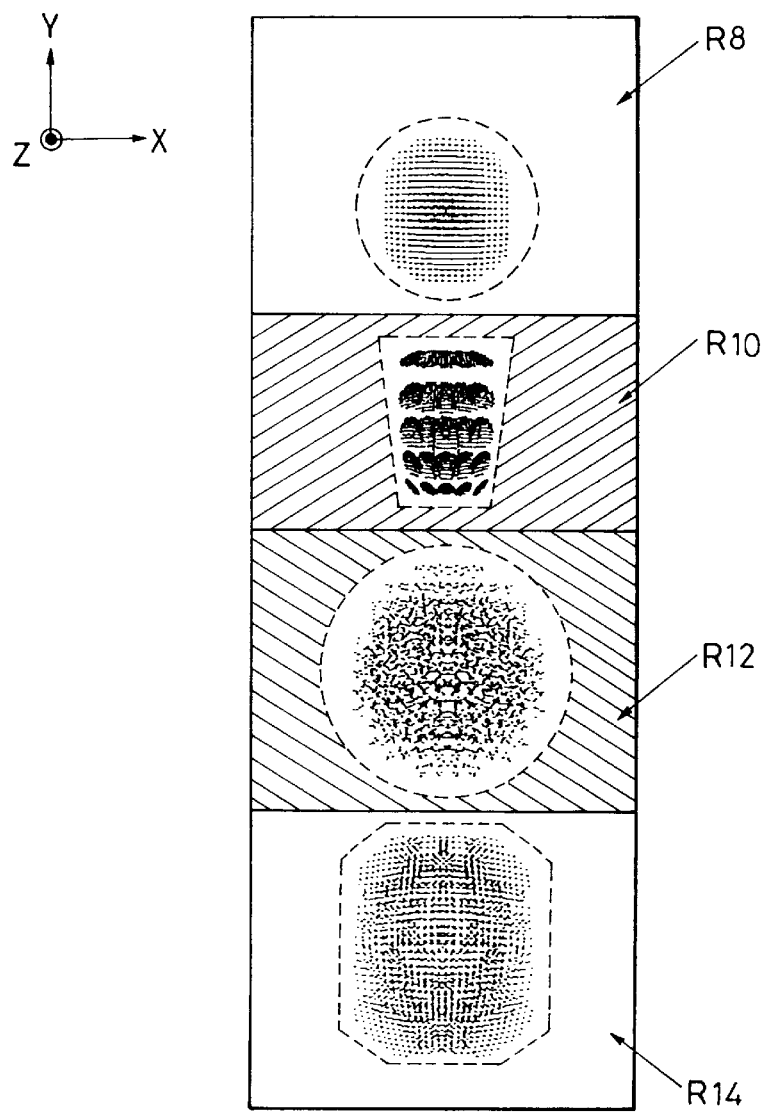
FIG. 17 illustrates shapes of the surfaces and distribution of light rays of an optical element according to the embodiment of the present invention viewed from the positive side of a Z-axis.
Figure 18:
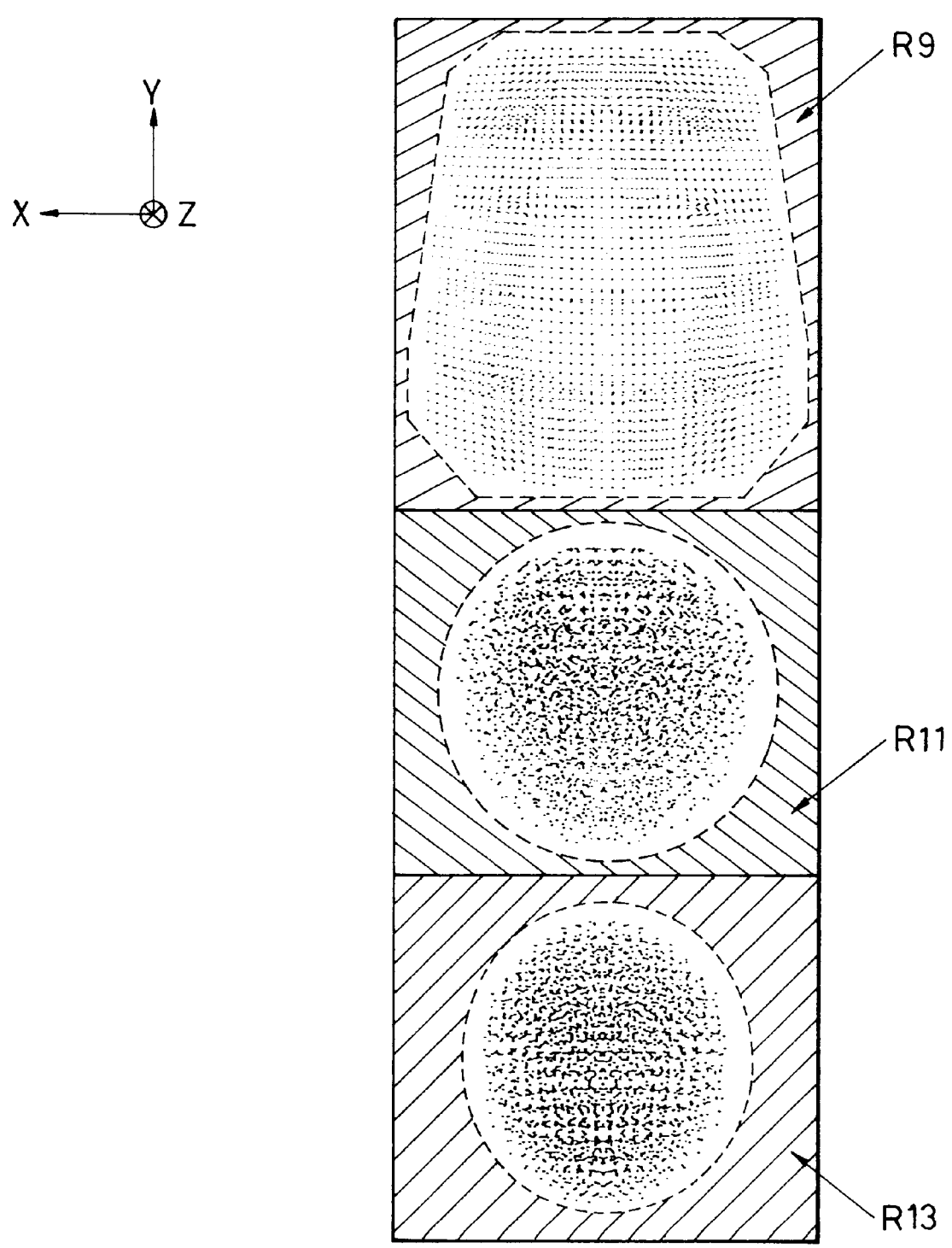
FIG. 18 illustrates shapes of the surfaces and distribution of light rays of an optical element according to the present invention viewed from the negative side of the Z-axis.

FIGS. 17 and 18 illustrate the optical element 2 of this embodiment viewed from the positive side and negative side of the Z-axis direction, respectively. These drawings also illustrate light ray distributions of each of the surfaces, respectively.

As shown in FIG. 17, the optical element 2 is constructed so that the concave refracting surface R8, the convex mirrors R10 and R12 which are incident surfaces, and the convex refracting surface R14 which is the emergent surface, are adjacent on to the other.

In addition, as shown in FIG. 18, the optical element 2 is constructed so that the concave mirrors R9, R11 and R13 are adjacent one to other.

In consideration of an adjacent portion between the concave mirrors R9 and R11 of FIG. 18, the image forming light rays are distributed in a trapezoidal shape on the concave mirror R9, but in an elliptical shape on the concave mirror R11. In contrast, each of the reflecting surfaces of the optical element 2 are formed into rectangular shapes from a construction viewpoint. Therefore, when the reflecting film is formed (evaporated) onto the full range of the reflecting surfaces, the reflecting film would be formed onto a range of the reflecting surfaces except for the incident range of the image forming light rays.

In consideration of a ghost light generated in the optical element 2, the ghost light may be usually generated with respect to the incident light from positions and angles different from those of the image forming light rays. Therefore, the light rays generally impinge on the positions of each of the surfaces departing from the incident range of the image forming light rays.

When the reflecting film is formed on the overall reflecting surfaces, the risk of generating ghost light from a portion other than the incident range of the image forming rays is remarkably increased. Therefore, it is desirable that the range of formation of the reflecting film is as small as possible to avoid generating ghost light.

Thus, in this embodiment, the reflecting film is formed on the reflecting mirror surfaces of R9 to R13 only within the range shown by the dotted lines, i.e., within the range which is substantially the same as the range in which the image forming light rays enter the reflecting surfaces (of course, with a certain allowance), so that ghost light is not generated at portions other than the incident range of the image forming light rays.

The optical element of this embodiment has at least three, integrally formed reflecting curved surfaces, ghost light is particularly easily generated. However, according to the present invention, the range of formation of the reflecting film is optimized as described above so as to effectively prevent ghost light.

In addition, according to the present invention, diagonally shaded portions in FIGS. 17 and 18 are coarse surfaces (uneven surfaces), such as diffusing surfaces, so that the intensity of unnecessary light or ghost light entering the portions can be reduced by a diffusion action of the diffusing surfaces.

Generally, when a metallic film such as an aluminum or silver film is directly evaporated on the reflecting surfaces of the optical element, it is highly possible that the reflecting surfaces will corrode under the environmental condition such as the high temperature and high humidity, whereby it becomes difficult to secure durability of the reflecting surfaces.

Thus, in the embodiment of the present invention, after evaporating the reflecting film such as an aluminum or silver film, and a dielectric film onto the reflecting surfaces, a protective film is evaporated thereon. As the protective film, a substance, such as $SiO_2$ which is resistant to environmental change, may be evaporated onto the reflecting surfaces. However, in order to impart a light shielding action to the reflecting surfaces, black paint and the like may be preferably applied onto the reflecting surfaces.

With the arrangement described above, in which the optical element includes a plurality of integrally formed reflecting surfaces, each having a curvature for effectively correcting aberration, with an antireflection film evaporated onto incident and emergent surfaces thereof, the range of evaporation of a reflecting film is optimized when evaporating the reflecting film onto the reflecting surfaces, and the form of the portions the reflecting surfaces other than the range of evaporation of the reflecting film are defined. As a result, there can be provided an optical element which minimizes the reduction in the transmission light amount of the entire optical element, and reduces the intensity of ghost light generated within the optical element.

In addition, an optical element having at least one of the following advantages can be provided:

The reflecting film is evaporated onto a plurality of reflecting surfaces each having a curvature, and the antireflection film is evaporated onto transmission surfaces, thereby minimizing the reduction in the transmission light amount of the overall optical element;

The reflecting film is evaporated in accordance with the range in which the image forming light ray enters the reflecting surfaces, thereby preventing generation of the ghost light;

The portions of the reflecting surfaces, except for the range in which the image forming light ray enters the reflecting surfaces, are made coarse to prevent ghost light in the above range;

The reflecting film is evaporated in the shape of a circle, an ellipse, or a polygon, thereby preventing the generation of the ghost light;

After evaporating the reflecting film onto the reflecting surfaces, a protective layer is provided thereon, thereby obtaining an optical element resistant to environmental change;

Light shielding properties are given to the protective layer, thereby preventing the generation of ghost light; and When total reflecting surfaces are included in the optical element, they are effectively used to prevent reduction in the transmission light amount.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An integrally formed optical element, comprising:
   an incident surface into which light flux from an object enters;
   a plurality of reflecting curved surfaces decentered one to the other from which the light flux entered from said incident surface is reflected, at least one of said plurality of reflecting curved surfaces being formed into a rotationally asymmetrical aspheric shape, wherein said shape has only one plane of symmetry; and
   an emergent surface from which the light flux from said plurality of reflecting curved surfaces is emitted,
   wherein an antireflection film is applied onto at least one of said incident surface and said emergent surface, and
   wherein the light flux emitted from said emergent surface forms an image.

2. An optical element according to claim 1, said plurality of reflecting curved surfaces having a reflecting film formed thereon, wherein a range of formation of said reflecting film is substantially equal to a range in which an effective light flux from the object enters.

3. An optical element according to claim 2, said plurality of reflecting curved surfaces having diffusing surfaces formed on the portions thereof other than the range of formation of said reflecting film.

4. An optical element according to claim 2, said plurality of reflecting curved surfaces having a reflection protective layer formed on said reflecting film.

5. An optical element according to claim 4, wherein a color of said reflection protective layer is black.

6. An optical instrument comprising an integrally formed optical element, said optical element comprising:
   an incident surface into which light flux from an object enters;
   a plurality of reflecting curved surfaces decentered one to the other from which the light flux entered from said incident surface is reflected, at least one of said plurality of reflecting curved surfaces being formed into a rotationally asymmetrical aspheric shape, wherein said shape has only one plane of symmetry; and
   an emergent surface from which the light flux from said plurality of reflecting curved surfaces is emitted,
   wherein an antireflection film is applied onto at least one of said incident surface and said emergent surface, and
   wherein the light flux emitted from said emergent surface forms an image.

7. An optical instrument according to claim 6, said plurality of reflecting curved surfaces having a reflecting film formed thereon, and
   wherein a range of formation of said reflecting film is substantially equal to a range in which an effective light flux from the object enters.

8. An optical instrument according to claim 7, said plurality of reflecting curved surfaces having diffusing surfaces formed on the portions thereof other than the range of formation of said reflecting film.

9. An optical instrument according to claim 7, said plurality of reflecting curved surfaces having a reflection protective layer formed on said reflecting film.

10. An optical instrument according to claim 9, wherein a color of said reflection protective layer is black.

11. An optical instrument according to claim 6, further comprising an image pick-up means for picking-up an image formed by said optical element.

12. An optical element according to claim 1, wherein an antireflection film is applied onto said incident surface and an antireflection film is applied onto said emergent surface.

13. An optical instrument according to claim 6, wherein an antireflection film is applied onto said incident surface and an antireflection film is applied onto said emergent surface.

* * * * *

UNITED STATES PATENT AND TRADEMARK OFFICE
CERTIFICATE OF CORRECTION

PATENT NO. : 5,995,287

DATED : November 30, 1999

INVENTOR(S) : Makoto SEKITA

Page 1 of 2

It is certified that error appears in the above-identified patent and that said Letters Patent is hereby corrected as shown below:

COLUMN 3:

Line 37, "a" should read --an--.

COLUMN 4:

Line 1, "a" should read --an--.

COLUMN 8:

Line 2, "vdi" should read --vdi--.
Line 37, "constant," should read --constants,--.
Line 42, "odd" should read --even--.
Line 61, "uy" should read --uY--.

COLUMN 9:

Line 39, "embodiments" should read --embodiment--.

COLUMN 11:

Line 34, "FIG." (second occurrence) should read --FIGS.--.

UNITED STATES PATENT AND TRADEMARK OFFICE
CERTIFICATE OF CORRECTION

PATENT NO. : 5,995,287
DATED      : November 30, 1999
INVENTOR(S): Makoto SEKITA Page 2 of 2

It is certified that error appears in the above-identified patent and that said Letters Patent is hereby corrected as shown below:

<u>COLUMN 12</u>:

Line 10, "on" should read --one--.
Line 13, "other." should read --the other.--.

Signed and Sealed this

Twenty-ninth Day of May, 2001

Attest:

NICHOLAS P. GODICI

*Attesting Officer*    *Acting Director of the United States Patent and Trademark Office*